Oct. 26, 1926.

W. W. BLAKELY

HOLD-DOWN DEVICE FOR VEHICLES

Filed Oct. 27, 1924   2 Sheets-Sheet 1

1,604,215

INVENTOR.
William W. Blakely

BY
ATTORNEYS

Oct. 26, 1926.  
W. W. BLAKELY  
1,604,215  
HOLD-DOWN DEVICE FOR VEHICLES  
Filed Oct. 27, 1924  
2 Sheets-Sheet 2
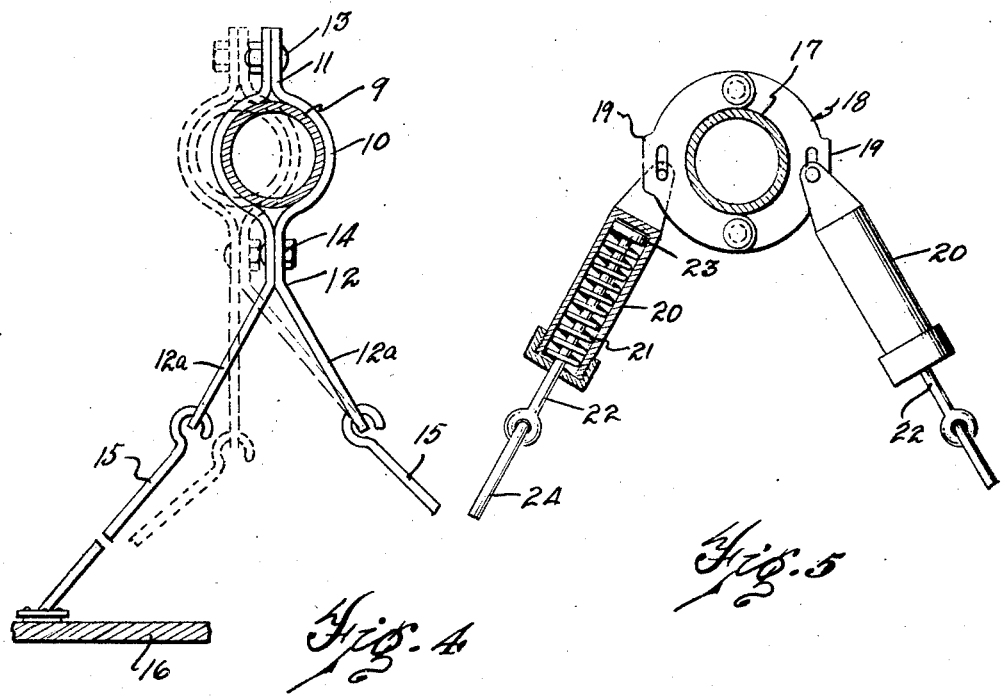
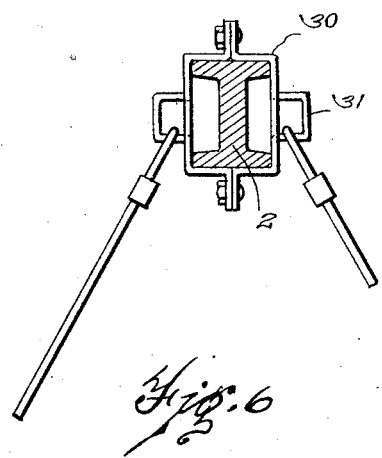
INVENTOR.  
William W. Blakely  
BY  
ATTORNEYS Patented Oct. 26, 1926.

1,604,215

UNITED STATES PATENT OFFICE.

WILLIAM W. BLAKELY, OF DETROIT, MICHIGAN.

HOLD-DOWN DEVICE FOR VEHICLES.

Application filed October 27, 1924. Serial No. 746,033.

This invention relates generally to anchorage devices for holding vehicles properly positioned within freight cars and the like.

One of the essential objects of the invention is to provide a simple and reliable anchorage device of this type that is adapted to yield slightly to permit the vehicle to move a limited distance responsive to shocks and jars encountered in transit.

Another object is to provide a strong and durable construction that can be manufactured at a comparatively low cost.

With the above and other objects in view the invention consists in certain novel features of construction, combinations and arrangements of parts as will be more fully described and particularly pointed out in the appended claims.

In the accompanying drawings:

Figure 4 is a view similar to Figure 2 but disclosing an alternative construction;

Figure 5 is a view similar to Figures 2 and 4 but showing a still further modification.

Figure 6 is a view similar to Figure 2 but showing a slightly modified form of construction.

Figure 1:
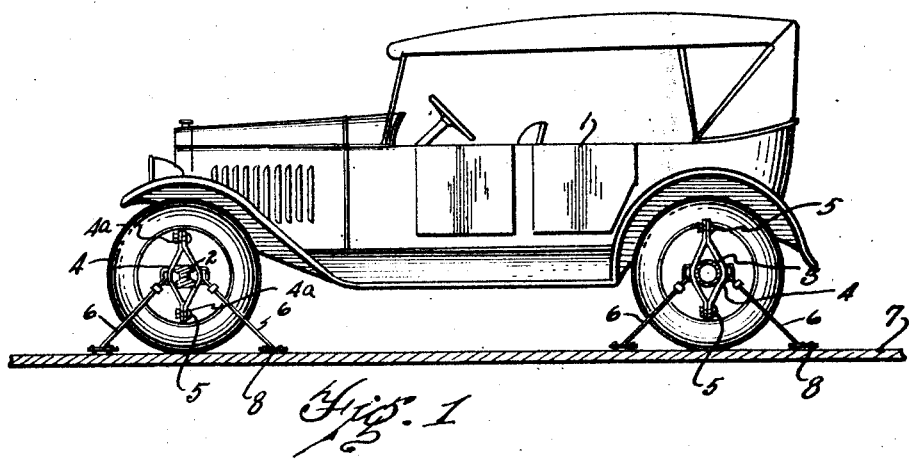
Figure 1 is a view mainly in side elevation of a vehicle arranged for shipment within a freight car or the like, and held in place by a plurality of the improved anchorage devices, the axles being in section.

It is usual to provide suitable blocks to engage the wheels of vehicles for holding the latter during shipment within freight cars and the like. However, when such blocks are used against pneumatic tires of motor vehicles, the tires being yieldable permit the motor vehicle to move a limited amount in opposite directions responsive to shocks and jars encountered in transit so that great care is required in positioning the wheel blocks upon the floor of the freight car to prevent adjacent vehicles from bumping together and to prevent the vehicles from bumping into the walls of the freight car and thus causing damage. Since motor vehicles have been equipped with the so-called balloon tires greater care than ever is required in the positioning of the blocks for the reason that this type of tire yields a great deal more than the standard pneumatic tire. As a result motor vehicles equipped with such tires have to be spaced further apart in the freight car and in view of this increased clearance fewer motor vehicles can be shipped in one freight car. With the present invention the objectionable features just referred to are overcome and I preferably provide suitable means which is adapted to yield slightly to permit the vehicle to move a limited amount responsive to shocks and jars encountered in transit.

Referring first to the construction described in views 1, 2 and 3, the numeral 1 designates a vehicle body having the front and rear axles 2 and 3 respectively. Upon each of these axles there is clamped one or more resiliently expansible two-part rings 4 serving as an attachment means for tie members 6. Each ring 4 comprises a pair of complementary parts, formed preferably of bar metal, their central portions having a semi-circular curvature adapting them to embrace the axle. The end portions of said parts project upwardly and downwardly as indicated at 4$^a$, and are rigidly connected, adjacent their extremities, by bolts or the like 5. At the front and back of the ring 4, arched lugs 4$^b$ are struck out and the upper ends of a pair of tie members 6 are secured to said lugs. Said tie members extend to the floor 7 of the freight car or the like, wherein the vehicle 1 is being shipped. The tie members 6 diverge toward front and back of the vehicle as they extend downwardly, and their lower ends are rigidly attached to said floor by suitable fastening plates 8.

Figure 2:
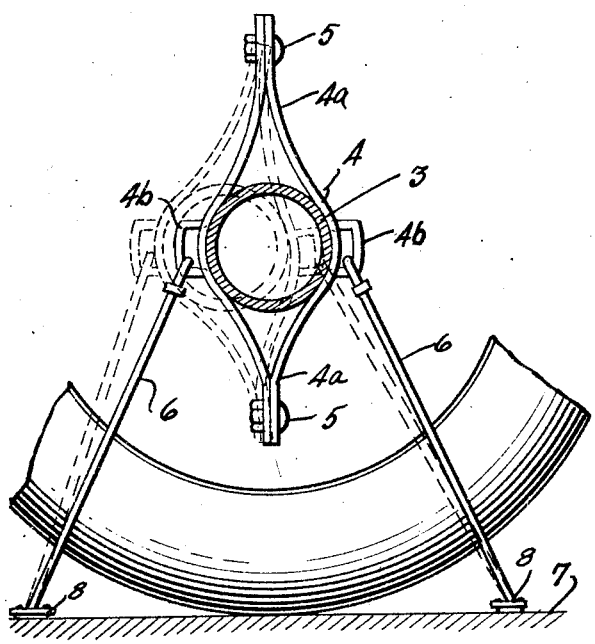
Figure 2 is a view to an enlarged scale sectionally showing an axle engaged by one of said devices.
Figure 3:
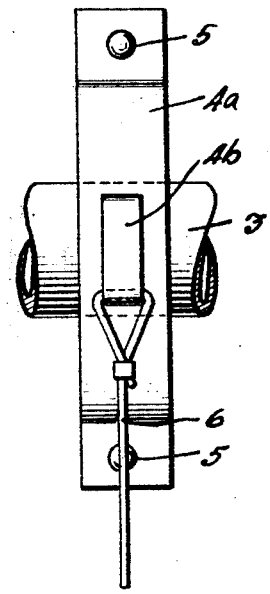
Figure 3 is a side view of the same.

In the use of the described invention, when the vehicle 1 receives a heavy shock acting forwardly or rearwardly, the described anchorage means permits it to respond to a limited extent to such a shock. Thus, Figure 2 indicates in dash lines a shifted position which the axle 3 may temporarily assume. This shifting is permitted by a slight rocking movement of the ring 4 accompanied by an expansion thereof. The expansion is provided for by the location of the fastenings 5 adjacent the free ends of the parts 4$^a$. When the anchored vehicle is relieved of the temporary stress, the parts 4 will spring back to their normal shape, and the vehicle will be returned to its normal position by said parts.

In the alternative structure shown in Figure 4 the axle 9 is engaged by a clamping ring 10 comprising a pair of complementary semi-circular parts having short ends 11 projecting above the axle and long end portions 12 projecting downwardly. The end portions 11 are bolted together as indicated at 13, and another bolt 14 connects the end portions 12 adjacent the axle. Below the bolt 14 said end portions diverge toward front and back of the vehicle as indicated at 12ª, and are engaged by a pair of tie members 15 extending to the floor 16 of the vehicle diverging toward front and rear as they extend downwardly.

In this construction a shock acting forwardly or rearwardly upon the anchored vehicle causes the axle to shift as shown in dash lines, the anchorage members assuming the positions also indicated in dash lines. It will be noted that in this construction the ring 10 does not rock upon the axle 9, the resiliency of the end portions 12ª permitting response of the vehicle to shocks.

In the further modification shown in Figure 5 an axle 17 is rotatively engaged by a two-part ring 18 having lugs 19 at the front and back thereof to which are pivotally secured housing members 20 for coil springs 21. Said springs are mounted upon tie rods 22, the upper ends of which are headed, as indicated at 23, to form abutments for said springs. Said rods project downwardly beyond said housings and their lower ends are engaged by tie members 24.

In this form of the invention a compression of one of the springs 21 allows the desired slight freedom of movement of the axle forward or back.

In Figure 6 I have shown a slight modification wherein the resiliently expansible two-part rings 30 are preferably provided intermediate their ends with substantially U-shaped portions 31 which are clamped upon the front axle 2 of the vehicle.

What I claim as my invention is:

1. In a vehicle anchorage device, a resiliently expansive ring, and a tie member secured to said ring.

2. A vehicle anchorage device comprising a resiliently expansive ring, and tie members extending downwardly from said ring at opposite inclinations to the axial plane of said ring.

3. An anchorage device comprising a ring and having resiliently yieldable portions and a pair of tie members secured to said portions and extending downwardly from said ring at opposite inclinations to the vertical plane thereof.

4. An anchorage device for vehicles comprising a two-part ring the parts of said ring being clamped together at diametrically opposite points of the ring, said parts having resiliently yieldable portions, and a pair of tie members secured to said portions and extended downwardly to a suitable support, and oppositely inclined to the vertical plane of said ring.

5. The combination with a vehicle, and a support therefor, of non-stretchable upwardly inclined means secured to said support, and yieldable means secured to said vehicle and non-stretchable means adapted to permit said vehicle to move a limited distance upon said support.

6. The combination with a vehicle, and a support therefor, of means anchoring the vehicle on said support including a member secured to said vehicle having yieldable sections, and non-yieldable tie members secured to said sections and to said support.

7. An anchorage device for vehicles including a sectional yieldable member adapted to be mounted on a portion of a vehicle, each section of said member having a projection, and separate tie members secured to said projections.

8. In an anchorage device for vehicles, the combination with a floor plate, and a non-stretchable tie member secured to said plate, of a yieldable member adapted to be carried by the vehicle connected to said tie member.

9. A vehicle anchorage device comprising a member having cooperating sections adapted to embrace a vehicle part, one section having a resilient yieldable portion, and a rigid tie member terminally connected to and extending at an angle from said portion.

In testimony whereof I affix my signature.

WILLIAM W. BLAKELY.